US008313715B2

(12) United States Patent
Missalla et al.

(10) Patent No.: US 8,313,715 B2
(45) Date of Patent: Nov. 20, 2012

(54) PROCESS AND PLANT FOR PRODUCING METAL OXIDE FROM METAL SALTS

(75) Inventors: Michael Missalla, Oberursel (DE); Guenter Schneider, Lorsch (DE); Jan Jarzembowski, Pretoria (ZA); Erwin Schmidbauer, Kastl (DE)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 13/146,037

(22) PCT Filed: Jan. 14, 2010

(86) PCT No.: PCT/EP2010/000150
§ 371 (c)(1),
(2), (4) Date: Sep. 22, 2011

(87) PCT Pub. No.: WO2010/083961
PCT Pub. Date: Jul. 29, 2010

(65) Prior Publication Data
US 2012/0014863 A1      Jan. 19, 2012

(30) Foreign Application Priority Data
Jan. 26, 2009   (DE) .................. 10 2009 006 094

(51) Int. Cl.
*B01J 8/00*      (2006.01)
*C01F 7/00*      (2006.01)
(52) U.S. Cl. ........ 423/74; 423/111; 423/148; 423/592.1; 423/625; 422/139; 422/217; 422/219; 422/232; 422/616; 422/620; 422/621; 422/622

(58) Field of Classification Search .............. 423/592.1, 423/625, 74, 111, 148; 422/139–147, 616–622, 422/217, 219, 232
See application file for complete search history.

(56) References Cited

U.S. PATENT DOCUMENTS

| | | | | |
|---|---|---|---|---|
| 3,898,043 A | * | 8/1975 | Schutte et al. | 422/140 |
| 4,209,496 A | * | 6/1980 | Carpenter et al. | 423/240 R |
| 5,286,472 A | * | 2/1994 | Fulford | 423/625 |
| 6,015,539 A | | 1/2000 | Schmidt et al. | |

FOREIGN PATENT DOCUMENTS

AU           87/72645         * 11/1987
(Continued)

OTHER PUBLICATIONS

Ullmann's Encyclopedia of Industrial Chemistry, 5 Aufl., Weinheim: VCH-Veriagsgesellschaft, ISBN 3-52720123-7, Bd. A1, pp. 579,580, 1985.
(Continued)

*Primary Examiner* — Steven Bos
(74) *Attorney, Agent, or Firm* — Leydig, Voit & Mayer, Ltd.

(57) ABSTRACT

A process for producing metal oxide from metal salts includes cleaning a metal salt in a filter. After cleaning, the metal salt is dried in a drying apparatus. Steam is formed in the drying apparatus. The metal salt is preheated in at least one preheating stage. The metal salt is calcined to metal oxide in a fluidized-bed reactor. The metal oxide is cooled. The steam formed in the drying apparatus is recirculated into the filter.

18 Claims, 3 Drawing Sheets

FOREIGN PATENT DOCUMENTS

| | | | |
|---|---|---|---|
| AU | 99/32524 | * | 8/1999 |
| DE | 36 15 622 A1 | | 11/1987 |
| DE | 102007014435 A1 | | 9/2008 |
| EP | 0245751 B1 | | 11/1989 |
| EP | 0 861 208 B1 | | 11/2001 |
| WO | WO 2005005318 A2 | | 1/2005 |
| WO | WO 2008/113553 A1 | | 9/2008 |
| WO | WO 2009026989 A1 | | 3/2009 |

OTHER PUBLICATIONS

Dorr-Oliver Eimco Horizontal Pan Filter for Alumina Product Hydrate Filtration. FLSmidth Dorr-Oliver Eimco GmbH, 2007, URL: http://www.flsmidthminerals.com/NRIrdonlyres/A4D0D9C4-6549-4B93-A3B8-152DDD7B58C4/32634/HPFAlumina2.pdf, retrieved on Aug. 14, 2009, p. 1-6.

* cited by examiner

PROCESS AND PLANT FOR PRODUCING METAL OXIDE FROM METAL SALTS

CROSS-REFERENCE TO PRIOR APPLICATIONS

This application is a U.S. National Phase application under 35 U.S.C. §371 of International Application No. PCT/EP2010/000150, filed on Jan. 14, 2010, and claims benefit to German Patent Application No. DE 10 2009 006 094.4, filed on Jan. 26, 2009. The International Application was published in English on Jul. 29, 2010 as WO 2010/083961 under PCT Article 21(2).

FIELD

The present invention relates to the production of metal oxide from metal hydroxide or other metal salts.

BACKGROUND

Metal hydroxides are a raw material for the production of metal oxides, which represent an important basic substance of inorganic chemistry. In their occurrences in nature, metal hydroxides chiefly are present in a mixed form, so that the raw materials must be cleaned up.

In the case of the production of aluminum hydroxide, this is accomplished by the so-called Bayer process, in which the mined minerals, mostly bauxite, are comminuted and impregnated with sodium hydroxide solution. Unsoluble residues, such as red mud which chiefly contains iron oxide, thus can be separated from the dissolved aluminum hydrate by filtration. By crystallization and further filtration, pure aluminum hydroxide ($Al(OH)_3$) is obtained from this solution.

A process for producing alumina ($Al_2O_3$) from aluminum hydroxide is described, for example, in EP 0 861 208 B1 or DE 10 2007 014 435 A1. The moist aluminum hydroxide initially is dried in a first suspension heat exchanger and preheated to a temperature of about 160° C. Upon separation in a cyclone separator, the solids are supplied to a second suspension preheater, in which they are further dried with the waste gas from the recirculation cyclone of a circulating fluidized bed, and then are charged to a fluidized-bed reactor of the circulating fluidized bed. In the fluidized-bed reactor, the aluminum hydroxide is calcined to alumina at temperatures of about 1000° C. A partial stream of the preheated aluminum hydroxide is branched off after the first suspension preheater (EP 0 861 208 B1) or after the second suspension preheater (DE 10 2007 014435 A1) and mixed with hot alumina withdrawn from the recirculation cylcone of the circulating fluidized bed. The hot product mixture subsequently is cooled in a multi-stage suspension cooler in direct contact with air and then supplied to a fluidized-bed cooler for final cooling.

EP 0 245 751 B1 describes a process for performing endothermal processes on fine-grained solids, with which the product heat within the entire process should be utilized in a better way. During the calcination of aluminum hydroxide, a partial stream of the starting material is supplied to an indirectly heated preheater for drying and subsequently introduced into an electrostatic precipitator together with the directly supplied feedstock. The solids then are supplied from the electrostatic precipitator via two series-connected preheating systems to a circulating fluidized bed, in which the solids are fluidized with fluidizing gas (primary air) and calcined at temperatures of about 1000° C. The stream of solids withdrawn from the circulating fluidized bed is cooled in an indirect fluidized-bed cooler forming a first cooling stage and then supplied to second and third cooling stages, each again in the form of fluidized-bed coolers, in order to further cool the solid product. The primary air heated in the first fluidized-bed cooler is introduced into the fluidized-bed reactor as fluidizing air with a temperature of 520° C., whereas the fluidizing air of the fluidized-bed coolers is fed into the fluidized-bed reactor as secondary air with a temperature of 670° C. The heat transfer medium of the second fluidized-bed cooler is supplied to the indirect preheater for the starting material as heating medium with a temperature of 200° C. and then recirculated to the inlet of the second fluidized-bed cooler upon cooling to 160° C. After being cleaned in the electrostatic precipitator, the waste gas of the preheater serving as a drying apparatus for the hydrate supplied is discharged to the surroundings.

The calcination of aluminum hydroxide requires a very large amount of energy. Conventional processes require an expenditure of energy of about 3000 kJ/kg of alumina produced.

SUMMARY

In an embodiment, the present invention provides a process for producing metal oxide from metal salts. A metal salt is cleaned in a filter. After cleaning, the metal salt is dried in a drying apparatus. Steam is formed in the drying apparatus. The metal salt is preheated in at least one preheating stage. The metal salt is calcined to metal oxide in a fluidized-bed reactor. The metal oxide is cooled. The steam formed in the drying apparatus is recirculated into the filter.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
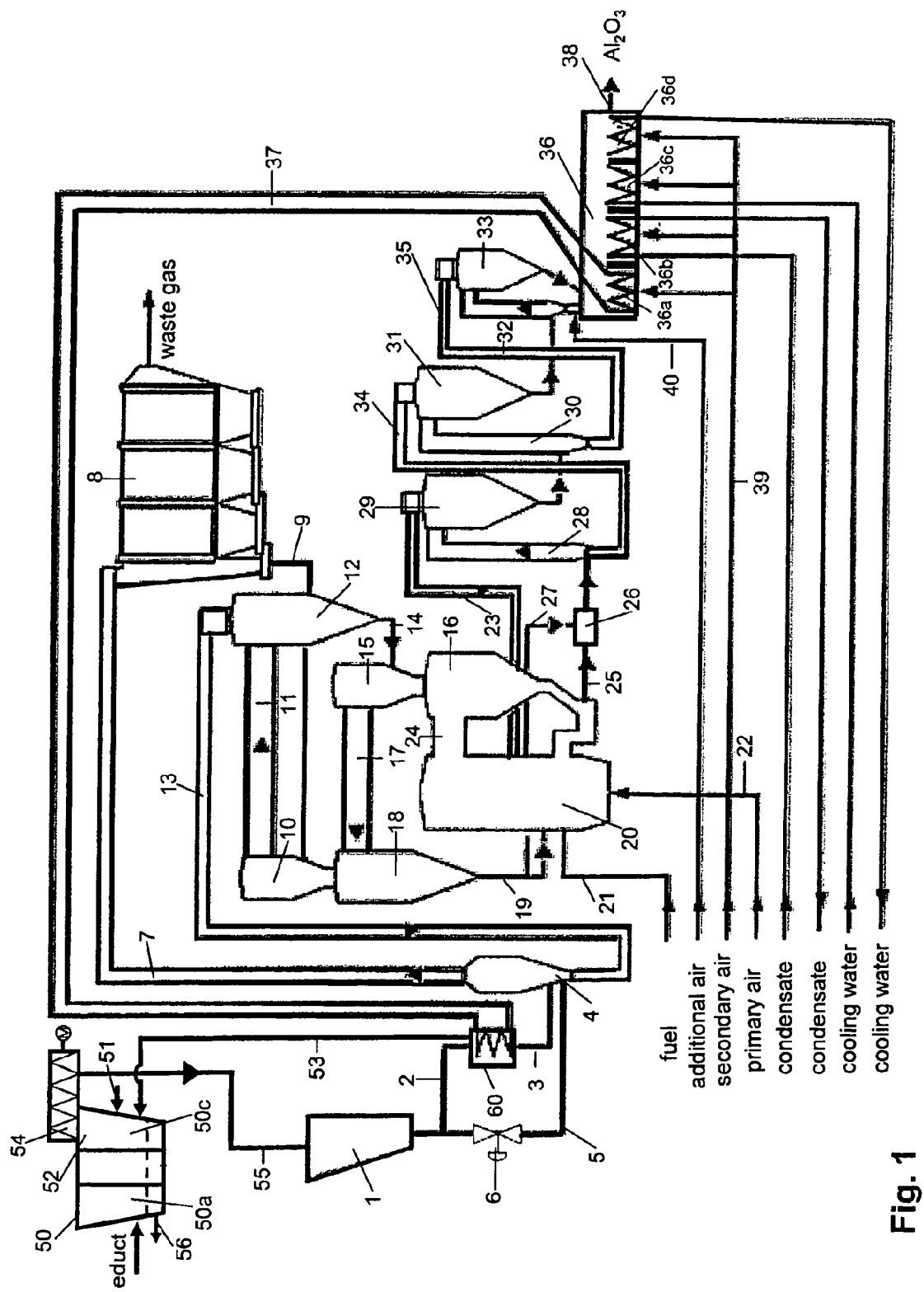
FIG. 1 schematically shows a plant for performing the process according to an embodiment of the invention, FIG. 2 schematically shows a drying apparatus for a metal salt according to an embodiment of the invention, and FIG. 3 schematically shows a perspective representation of the drying apparatus for the metal salt according to an embodiment of the invention.

In an embodiment, the present invention provides a process and plant for the production of metal oxide from metal hydroxide or other metal salts, in particular from aluminum hydroxide, wherein the metal salt is dried in a drying apparatus, preheated in at least one preheating stage and calcined to metal oxide in a fluidized-bed reactor, and wherein the metal oxide obtained then is cooled.

It is an aspect of the invention to decrease the energy demand of a calcining plant and reduce the grain disintegration in particular when drying the hydrate.

In accordance with an embodiment of the invention, the metal salt, before drying, is cleaned in a filter and that steam formed in the drying apparatus is recirculated into the filter.

By recirculating steam to the filter, the temperature is increased there, so that stronger drying of the metal salt (hydrate) is achieved. In this way, the mass flow of the hydrate into the drying apparatus can be increased, so that the specific energy demand of the plant can be reduced.

In accordance with a preferred embodiment of the invention, the metal salt to be dried is fluidized in the drying apparatus, in order to increase the heat transfer and thus be able to keep the heat exchange surface as small as possible.

In accordance with an embodiment of the invention, fluidization is effected by supplying fluidizing gas, for example air.

To reduce the air content in the waste gas of the drying apparatus, the supply of fluidizing gas can, however, also be reduced or even be shut off completely in accordance with a development of the invention. The hydrate is fluidized by itself by evaporation of the surface water.

In accordance with an embodiment of the invention, a preferably liquid heat transfer medium, for example a heat transfer oil or preferably water, is supplied to the drying apparatus, with which the metal salt is heated indirectly and which is heated in an indirect cooling stage, for example a fluidized-bed cooler or a rotary cooler provided subsequent to the fluidized-bed reactor.

In accordance with an embodiment of the invention, the heat transfer medium is circulated between the indirect cooling stage and the drying apparatus, so that no additional heat transfer medium must be supplied. In the cooling stage, sufficient energy is available, in order to heat the heat transfer medium and achieve an efficient drying. At the same time, the energy transfer between cooling stage and drying is controlled in dependence on the amount and moisture of the aluminum hydroxide, so that a higher flexibility is achieved in the plant control and the energy consumption is reduced.

In accordance with an embodiment of the invention, the heat transfer medium is supplied to the drying apparatus with a temperature of 130 to 220° C., preferably 150 to 200° C. and in particular 170 to 190° C. By slowly drying the hydrate at a low temperature level, the load of the hydrate particles and hence the probability for fracture is reduced.

In accordance with a preferred embodiment of the invention, a partial stream of the hydrate is guided past the drying apparatus. Thus, it is possible to react to different moisture contents of the hydrate. At the same time, the temperature of the waste gas can be controlled. In accordance with the invention, the waste gas temperature can be decreased to 110 to 170° C., preferably 120 to 140° C., so that the energy loss caused by the waste gas discharged via the chimney upon passage through the filter is reduced.

In another embodiment, the present invention provides a plant for producing metal oxide from metal salts, which is suitable for performing the process described above. The plant includes a drying apparatus for drying the metal salt, at least one preheater for preheating the metal salt, a reactor for calcining the metal salt to metal oxide, and at least one cooling apparatus for cooling the metal oxide obtained. In accordance with an embodiment of the invention, at least one filter for filtration of the metal salt is provided before the drying apparatus, wherein a waste gas conduit of the drying apparatus is connected with the filter.

Preferably, the filter includes a steam hood into which the waste gas conduit of the drying apparatus opens. The waste gas, substantially steam, which is supplied from the drying apparatus can increase the temperature in the filter and thereby achieve a stronger drying of the hydrate.

In accordance with an embodiment of the invention, the heat transfer medium is passed through the drying apparatus via circulation conduits, wherein the circulation conduits preferably are connected with the first stage of the indirect cooling stage after the fluidized-bed reactor. In this way, the heat recovered in the process can efficiently be used for drying the hydrate and the energy demand of the plant is further reduced.

A simple maintenance and adaptation of the plant to the requirements can be achieved in accordance with an embodiment of the invention in that the circulation conduits are combined to a plurality of heat exchanger bundles, which can separately be removed from a housing of the drying apparatus.

In accordance with an embodiment of the invention, a bypass conduit is provided around the hydrate drier, which is connected with the first preheating stage, in order to be able to supply a partial stream of the hydrate directly to the first preheating stage.

In accordance with an embodiment of the invention, the division of the hydrate stream between the hydrate drier and the bypass conduit is effected via a control valve, which preferably is actuated in dependence on the waste gas temperature.

According to the flow diagram of the process of the invention, which is illustrated in FIG. 1, the educt, in particular aluminum hydroxide sludge, is charged to a multi-stage filtration apparatus (hydrate filter) 50, in which the aluminum hydroxide ($Al(OH)_3$) is washed with washing water or washing liquor supplied via a conduit 51 and guided in counterflow to the hydrate sludge, in order to achieve the desired product purity. The washing liquor has been discharged from the chamber 50a of the hydrate filter 50 via the conduit 56. In a steam hood 52 of the last stage 50c of the hydrate filter 50, steam is introduced via a conduit 53, in order to increase the temperature and thereby provide for a further drying of the hydrate. The moisture of the hydrate discharged via a discharge screw 54 thereby can be reduced from the usual 7% to 3-6%.

Via a conduit 55, the filter-moist aluminum hydroxide then is supplied to a charging station 1 and via a conduit 2 introduced into a drying apparatus (hydrate drier) 60, in which the hydrate is heated to a temperature of about 100 to 110° C. by indirect heat exchange with a liquid heat transfer medium, in particular water, and is dried almost completely.

Via a conduit 3, the dried hydrate subsequently is supplied to a suspension heat exchanger 4 of a first preheating stage and preheated to a temperature of 100 to 200° C. The temperature control in the hydrate drier 60 is effected in dependence on the moisture of the hydrate supplied, so that it is possible to quickly react to fluctuations in the starting substance, without reducing the energy efficiency of the plant.

A partial stream of the hydrate can be supplied via a bypass conduit 5 past the hydrate drier 60 directly to the suspension heat exchanger 4. The size of the partial stream is adjusted via a control valve 6, which can be arranged in the conduit 2 or the bypass conduit 5. The control of the bypass stream is effected in dependence on the waste gas temperature, in order to keep the energy loss as low as possible. If a greater amount of the hydrate is guided over the hydrate drier 60, the waste gas temperature of the suspension heat exchanger 4 rises, since more moisture (water) is removed in the hydrate drier 60 and is not evaporated in the succeeding suspension heat exchanger 4. When supplying a small amount of hydrate to the hydrate drier 60, a greater amount of moist hydrate is supplied to the suspension heat exchanger 4 and the waste gas temperature decreases correspondingly.

The solids introduced into the suspension heat exchanger 4 are entrained by a waste gas stream coming from a second preheating stage, are heated by the same and pneumatically introduced via a conduit 7 into the inlet region of an electrostatic gas cleaning (ESP) 8 constituting a preseparator. In the electrostatic precipitator 8, the gas is cleaned and discharged into a non-illustrated chimney with a temperature of 110 to 170° C., preferably 120 to 140° C. Because of the reduced content of water from the moist hydrate in the waste gas as a result of the upstream hydrate drier 60, there is no risk of condensation of water on the parts of the plant despite this low temperature. Due to the lack of condensation, the corrosion in the plant is avoided.

Via a conduit 9, the solids emerging from the electrostatic gas cleaning 8 are delivered into a second suspension heat exchanger 10 of the second preheating stage, in which the solids are entrained by the gas stream emerging from a third preheating stage, heated to a temperature of 150 to 300° C. and supplied to a separating cyclone 12 via a conduit 11. Via a conduit 13, the waste gas stream of the separating cyclone 12 is supplied to the suspension heat exchanger 4, so that the hydrate is heated and delivered to the electrostatic precipitator 8.

Via a conduit 14, the solids from the separating cyclone 12 are fed into a third suspension heat exchanger 15 (third preheating stage), entrained by a gas stream emerging from a recirculation cyclone 16 of a circulating fluidized bed and dewatered further at temperatures of 200 to 450° C., in particular 250 to 370° C. and at least partly dehydrated (precalcined) to aluminum monohydrate (AlOOH).

Via a conduit 17, the gas-solids stream is supplied to a separating cyclone 18, in which in turn a separation of the gas-solids stream is effected, wherein the solids are discharged downwards through a conduit 19 and the waste gas is introduced into the second suspension heat exchanger 10 of the second preheating stage.

In the second and in particular the third preheating stage, a precalcination of the metal salts thus is effected. Precalcination in the sense of the present invention is understood to be the partial dehydration or elimination of compounds, such as HCl and NOx. On the other hand, calcination refers to the complete dehydration or elimination of compounds such as $SO_2$. Metal salts in the sense of the invention preferably are metal hydroxides or metal carbonates, in particular aluminum hydroxide. However, in other embodiments, the invention is not limited to these metal salts, but can be employed for all compounds, in particular metal compounds, which before a heat treatment are subjected to a liquid separation, for example also silicates.

After the separating cyclone 18 adjoining the third suspension heat exchanger 14, the solids stream is divided by means of an apparatus described for instance in DE 10 2007 014 435 A1. Via a conduit 19, a main stream containing about 80 to 90% of the solids stream is supplied to a fluidized-bed reactor 20, in which the aluminum monohydrate is calcined at temperatures of 850 to 1100° C., in particular about 950° C. and dehydrated to alumina ($Al_2O_3$). The supply of the fuel required for calcination is effected via a fuel conduit 21, which is arranged at a small height above the grate of the fluidized-bed reactor 20. The oxygen-containing gas streams required for combustion are supplied as fluidizing gas (primary air) via a supply conduit 22 and as secondary air via a secondary gas supply conduit 23. Due to the supply of gas, a relatively high suspension density is obtained in the lower reactor region between the grate and the secondary gas supply conduit 23, and a comparatively lower suspension density above the secondary gas supply conduit 23. After the usual compression the primary air is fed into the fluidized-bed reactor 20 with a temperature of about 90° C. without further heating. The temperature of the secondary air is about 550° C.

Via a connecting conduit 24, the gas-solids suspension enters the recirculation cyclone 16 of the circulating fluidized bed, in which a further separation of solids and gas is effected. The solids emerging from the recirculation cyclone 16 via the conduit 25, which have a temperature of about 950° C., are fed into a mixing tank 26. Via a bypass conduit 27, the partial stream of the aluminum monohydrate separated below the separating cyclone 18, which has a temperature of about 320 to 370° C., is also introduced into the mixing tank 26. In the mixing tank 26, a mixing temperature of about 700° C. is adjusted corresponding to the mixing ratio between the hot alumina stream supplied via the conduit 25 and the aluminum monohydrate stream supplied via the bypass conduit 27. The two product streams are thoroughly mixed in the mixing tank 26, which includes a fluidized bed, so that the aluminum monohydrate supplied via the bypass conduit 27 is also completely calcined to alumina. A very long residence time of up to 30 minutes or up to 60 minutes leads to an excellent calcination in the mixing tank. However, a residence time of less than 2 minutes, in particular about 1 minute or even less than 30 seconds can also be sufficient.

From the mixing tank 26, the product obtained is introduced into a first suspension cooler formed of rising conduit 28 and cyclone separator 29. Via the secondary gas supply conduit 23, the waste gas of the cyclone separator 29 is fed into the fluidized-bed reactor 20 as secondary air, the solids into the second suspension cooler formed of rising conduit 30 and cyclone separator 31, and finally into the third suspension cooler formed of rising conduit 32 and cyclone separator 33. The gas flow through the individual suspension coolers is effected in counterflow to the solids via the conduits 35 and 34.

After leaving the last suspension cooler, the alumina produced undergoes a final cooling in the fluidized-bed cooler 36 equipped with three to four cooling chambers. The alumina enters its first chamber 36a with a temperature of about 300° C. and heats a liquid heat transfer medium, in particular water, to a temperature of 140 to 195° C., preferably 150 to 190° C., and in particular 160 to 180° C. The heated heat transfer medium is supplied to the hydrate drier 60 via a circulation conduit 37, in order to dry the metal salt (hydrate) by indirect heat exchange. The pressure in the heat transport circuit preferably is adjusted such that a condensation of the heat transfer medium in the hydrate drier 60 is avoided and is about 1 to 50 bar and in particular between 2 and 40 bar.

After passing through the hydrate drier 60, the heat transfer medium is recirculated to the first stage 36a of the fluidized-bed cooler via the circulation conduit 37 with a temperature of about 100 to 190° C., preferably 120 to 180° C. and in particular 140 to 170° C.

In the downstream chambers 36b to 36d, the alumina is cooled further to a temperature of about 80° C. by a heat transfer medium, preferably water, guided in counterflow and then is discharged as product via a conduit 38.

The solids in the chambers 36a to 36d are fluidized by means of secondary air, which is supplied with a temperature of 80 to 100° C. via a conduit 39. The secondary air subsequently is withdrawn from the fluidized-bed cooler 36 and used as conveying air for the third suspension cooler. Via a conduit 40, additional air can be supplied. Instead of air, pure oxygen or air enriched with oxygen with an oxygen content of 20 to 100 vol-% can also be supplied via the conduits 39 and/or 40.

Figure 2:
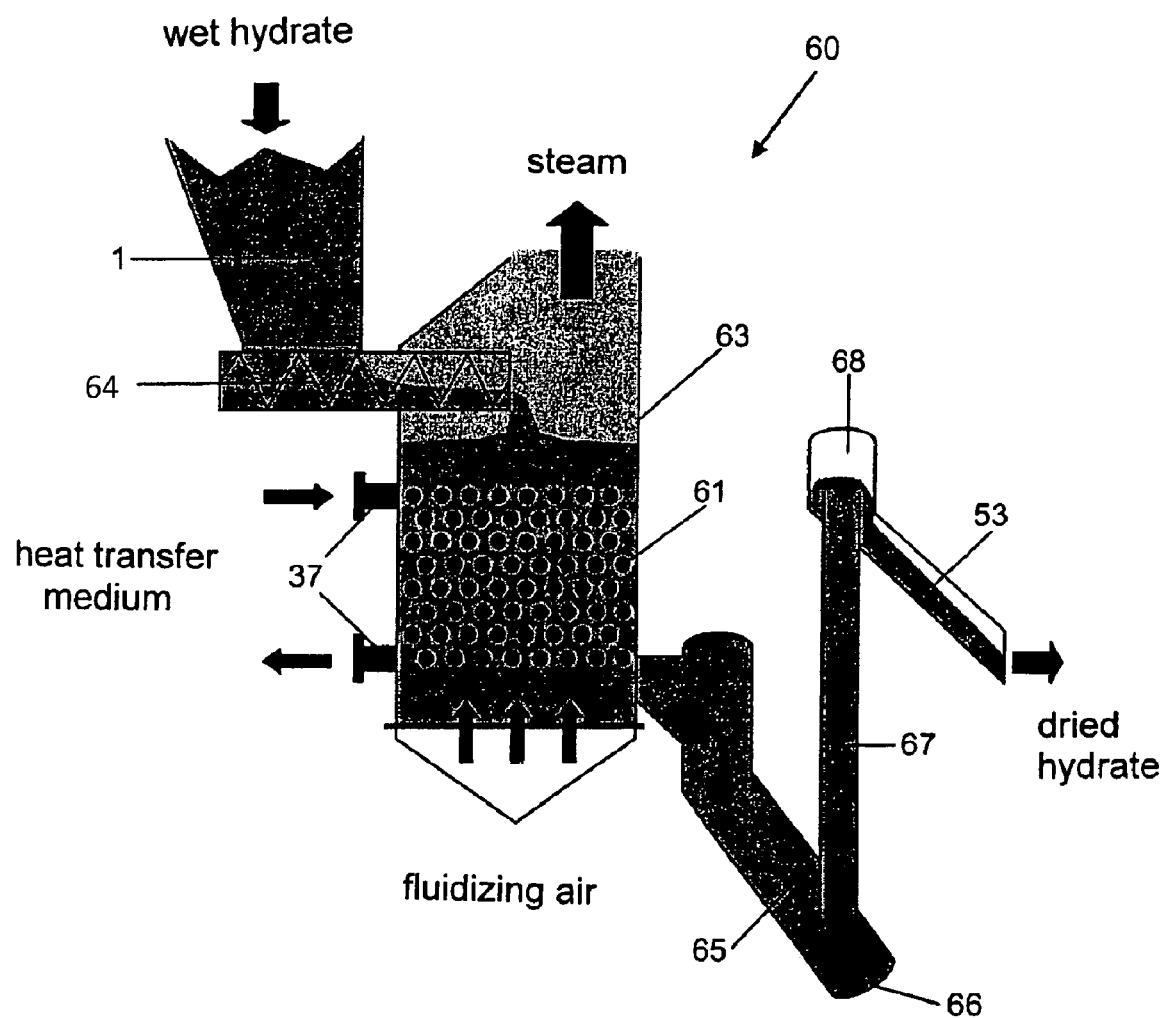
Figure 3:
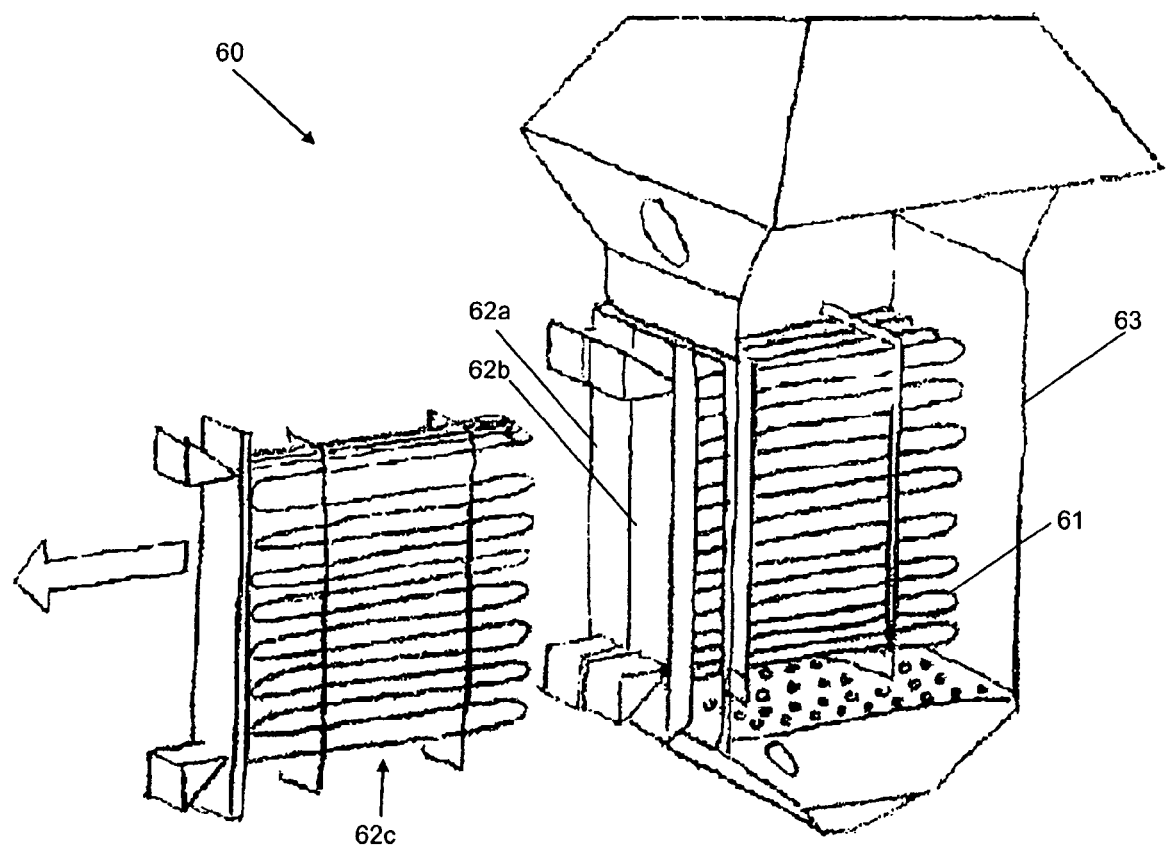

In FIGS. 2 and 3, the hydrate drier 60 is shown in greater detail. The heat transfer medium supplied via the circulation conduit 37 is fed into heat exchange conduits 61 and passes through the hydrate drier 60, before it is recirculated to the fluidized-bed cooler 36 via the circulation conduit 37. The heat exchange conduits 61 are combined to for example three heat exchanger bundles, which can be withdrawn from the housing 63 of the hydrate drier 60 via separate slide-in units 62a to 62c (see FIG. 3). In this way, the maintenance of the hydrate drier 60 is substantially simplified.

The hydrate introduced into the hydrate drier 60 from the charging station 1 via the conveying screw 64 is maintained in the fluidized condition by supplying fluidizing gas, in particular air, in order to increase the heat transfer and thereby dimension the heat exchange surface as small as possible. The hydrate slowly is dried at a low temperature level and with relatively small temperature gradients or heating rates. Due to this careful treatment, the load of the hydrate particles is reduced and the probability for particle fracture is decreased. In this way, the content of fine dust in the solids is reduced, which leads to lower pressure losses in the plant. Since the steam obtained when drying the hydrate effects a fluidization of the solids, the supply of the fluidizing gas can be reduced or even be interrupted completely. In this way, a more careful treatment of the hydrate is achieved. The volume flow of the fluidizing gas supplied preferably is controlled and adjusted corresponding to the moisture of the metal salt such that a sufficient fluidization is ensured.

It is also possible to wholly or partly use the waste gas from the plant as fluidizing gas. For this purpose, the entire waste gas stream or a part thereof can be used after dust separation, for example after the ESP and possibly a further gas cleaning, for example with a dust filter constituting a bag filter. In addition, ambient air and/or waste gas from an oxygen enrichment plant (i.e. gas with reduced oxygen content) can be admixed.

The dried hydrate flows off from the hydrate drier 60 via a downpipe 65. At the bottom 66 of the downpipe 65 a rising pipe 67 is branched off, which substantially extends vertically upwards. The solids at the bottom of the downpipe 65 are fluidized by means of a nozzle. The nozzle can be directed upwards or downwards, in order to be able to prevent obstructions more reliably. The solids at the bottom of the downpipe 65 are fluidized using any suitable method. It is possible, for example, to provide a cap nozzle or a nozzle with a porous body provided at its end, which should prevent an obstruction of the nozzle. It is also possible to supply the conveying gas via a fluidizing cloth or some other porous medium, which is arranged at the bottom of the downpipe over a non-illustrated gas distributor. The solids ascend through the rising pipe 67 into an expansion vessel 68 and are supplied from the same via the conduit 3 to the suspension heat exchanger 4 of the first preheating stage. Instead of the expansion vessel 68 a simple elbow fitting can also be provided at the end of the rising pipe 67.

Via the conduit 53, the steam obtained when drying the hydrate is recirculated to the hydrate filter 50 and used there as described above for reducing the hydrate moisture. Since the amount of heat released by the fluidized-bed cooler 36 to the heat transfer medium only depends on the amount of alumina produced, the mass flow of the hydrate into the hydrate drier 60 can be increased by the lower hydrate moisture. As a result, the specific energy demand of the plant can further be reduced.

The gas stream from the drier 60 can be mixed completely, but preferably only in part, with the waste gas of the plant, for example after the ESP 8, possibly after a further gas cleaning, for example with a dust filter. A mixture with ambient air and/or waste gas from an oxygen enrichment plant (i.e. gas with reduced oxygen content) likewise is possible. Hence, the temperature, the volume flow and/or the water content of the gas, which is supplied to the steam hood 52, can be controlled and adjusted corresponding to the requirements.

By means of an embodiment of the invention, the temperature in the individual stages of the process can accurately be adjusted, whereby the process can be optimized and the energy consumption can be reduced. It is possible to quickly react to fluctuations in the quality, in particular the moisture of the starting product. The waste gas temperatures in the chimney and hence the energy losses can be reduced distinctly as compared to the prior art. With a constant product quality, simulation calculations suggest a reduction of the required energy per kg of product of up to 10%. In addition, a careful treatment of the solids is obtained, so that the fracture of particles can be reduced.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

The invention claimed is:

1. A process for producing metal oxide from metal salts, the process comprising:
    cleaning a metal salt in a filter;
    drying, after the cleaning, the cleaned metal salt in a drying apparatus, steam being formed in the drying apparatus;
    preheating the dried metal salt in at least one preheating stage;
    calcining the preheated metal salt to metal oxide in a fluidized-bed reactor;
    cooling the metal oxide; and
    recirculating the steam formed in the drying apparatus into the filter.

2. The process according to claim 1, wherein the metal salt is aluminum hydroxide.

3. The process according to claim 1, wherein the cleaned metal salt is fluidized in the drying apparatus.

4. The process according to claim 3, wherein the cleaned metal salt is fluidized by supplying fluidizing gas to the drying apparatus.

5. The process according to claim 3, wherein the cleaned metal salt is fluidized by the steam formed in the drying apparatus.

6. The process according to claim 1, further comprising supplying a heat transfer medium to the drying apparatus so as to indirectly heat the cleaned metal salt, the heat transfer medium being heated in an indirect cooler disposed downstream of the fluidized-bed reactor.

7. The process according to claim 6, wherein the heat transfer medium is a liquid heat transfer medium.

8. The process according to claim 6, wherein the heat transfer medium is circulated between the drying apparatus and the indirect cooler.

9. The process according to claim 6, wherein the heat transfer medium is supplied to the drying apparatus, the supplied heat transfer medium having a temperature in a range from 130 to 220° C.

10. The process according to claim 1, further comprising guiding a partial stream of the metal salt past the drying apparatus.

11. A plant for producing metal oxide from metal salts comprising:
    a drying apparatus configured to dry the metal salt, the drying apparatus including a waste-gas conduit;
    a filter disposed upstream from the drying apparatus and configured to filter the metal salt, the filter being connected to the waste-gas conduit;
    a preheater configured to preheat the metal salt;

a reactor configured to calcine the metal salt to metal oxide; and a cooling apparatus configured to cool the metal oxide.

12. The plant according to claim 6, wherein the metal salt is aluminum hydroxide.

13. The plant according to claim 6, wherein the filter includes a steam hood and the waste-gas conduit opens into the steam hood.

14. The plant according to claim 6, wherein the drying apparatus includes heat exchange conduits having a heat transfer medium.

15. The plant according to claim 14, wherein the heat exchange conduits include a plurality of heat exchanger bundles that are separately removable from a housing of the drying apparatus via a plurality of slide-in units.

16. The plant according to claim 14, wherein the cooling apparatus includes a multi-stage cooler for indirectly cooling the metal oxide and the heat exchange conduits are connected with a first stage of an indirect cooler via a circulation conduit for the heat transfer medium.

17. The plant according to claim 6, further comprising a bypass conduit configured to bypass the drying apparatus and connected with a first preheating stage of the preheater.

18. The plant according to claim 17, further comprising a control valve configured to divide a hydrate stream between the drying apparatus and the bypass conduit.

* * * * *